(12) United States Patent
Julliard

(10) Patent No.: US 11,808,622 B2
(45) Date of Patent: Nov. 7, 2023

(54) ACOUSTIC MEASURING DEVICE FOR REDUCING FLOW RESONANCE

(71) Applicant: Airbus Operations SAS, Toulouse (FR)

(72) Inventor: Emmanuel Julliard, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/686,787

(22) Filed: Mar. 4, 2022

(65) Prior Publication Data
US 2022/0291037 A1    Sep. 15, 2022

(30) Foreign Application Priority Data

Mar. 10, 2021  (FR) ...................................... 2102318

(51) Int. Cl.
*G01H 3/00*     (2006.01)
*B64F 5/60*     (2017.01)
*H04R 1/30*     (2006.01)
*H04R 1/08*     (2006.01)

(52) U.S. Cl.
CPC ................. *G01H 3/00* (2013.01); *B64F 5/60* (2017.01); *H04R 1/086* (2013.01); *H04R 1/30* (2013.01); *H04R 2410/07* (2013.01)

(58) Field of Classification Search
CPC . B64F 5/60; G01H 15/00; G01H 3/00; G01N 29/2462; G01N 29/2468; G01N 29/28; G10K 11/30; H04R 1/086; H04R 1/30; H04R 2410/07
See application file for complete search history.

(56) References Cited

U.S. PATENT DOCUMENTS

| 6,681,023 | B1 * | 1/2004 | Turnbull | H04R 1/342 |
| | | | | 381/338 |
| 7,565,842 | B2 * | 7/2009 | Nagahara | G01F 1/667 |
| | | | | 73/644 |
| 9,880,133 | B1 * | 1/2018 | Stephanou | G01N 29/07 |

(Continued)

FOREIGN PATENT DOCUMENTS

| EP | 2541541 A1 * | 1/2013 | ........... G01N 29/043 |
| FR | 3017708 A1 | 8/2015 | |

(Continued)

OTHER PUBLICATIONS

Fleury et al, Optimization of Microphone Array Wall Mountings in Closed-Section Wind Tunnels, AIAA Journal vol. 50, No. 11, Nov. 2012 (Year: 2012).*

(Continued)

*Primary Examiner* — David L Singer
(74) *Attorney, Agent, or Firm* — Greer, Burns & Crain, Ltd.

(57) ABSTRACT

An acoustic measuring device suitable for performing measurements on a surface in contact with a flow. This acoustic measuring device comprises an acoustic surface delimiting a cavity, which has an axis of revolution, which comprises a recess centered with respect to the axis of revolution, configured to house an acoustic sensor and which, in a longitudinal plane passing through the axis of revolution, follows a logarithmic profile which extends from a first edge separating the recess and the acoustic surface.

9 Claims, 1 Drawing Sheet

(56) References Cited

U.S. PATENT DOCUMENTS

| | | | | |
|---|---|---|---|---|
| 2009/0285432 A1* | 11/2009 | Schnitta | ........... | G10K 11/17861 |
| | | | | 381/353 |
| 2010/0141090 A1* | 6/2010 | Yoon | ....................... | G01H 11/08 |
| | | | | 310/322 |
| 2015/0241267 A1 | 8/2015 | Bousquet et al. | | |
| 2016/0178426 A1* | 6/2016 | Gurumohan | ........ | G01F 23/2962 |
| | | | | 73/290 V |
| 2018/0233827 A1* | 8/2018 | Agranat | ................. | G10K 11/04 |
| 2018/0234750 A1* | 8/2018 | Agranat | ................. | H04R 1/021 |
| 2019/0040883 A1* | 2/2019 | Cohen | ..................... | B64C 23/00 |
| 2021/0377652 A1* | 12/2021 | Unruh | ....................... | G10K 9/22 |

FOREIGN PATENT DOCUMENTS

| | | | | |
|---|---|---|---|---|
| GB | 1487308 A | * | 9/1977 | ............. G01H 9/002 |
| KR | 102369170 B1 | * | 8/2020 | ............. G01H 17/00 |

OTHER PUBLICATIONS

Koop et al, Microphone-array processing for wind-tunnel measurements with strong background noise, 14th AIAA/CEAS Aeroacoustics Conference (29th AIAA Aeroacoustics Conference) May 5-7, 2008, Vancouver, British Columbia Canada (Year: 2008).*

VanDercreek et al., Design and Evaluation of Microphone Cavity Geometries for Wind-Tunnel Acoustic Measurements, AIAA SciTech Forum Jan. 7-11, 2019, San Diego, California, AIAA Scitech 2019 Forum (Year: 2019).*

Jonathan Westhues, Logarithmic Horns, webpage <https://cq.cx/horn.pl>, retrieved from Internet Archive Wayback Machine webpage <https://web.archive.org/web/20060117134041/https://cq.cx/horn.pl> (Year: 2006).*

French Search Report; priority document.

Appel De Gardane et al., "Validation of Numerical Approach for Assessing the Performance of a Microphone Mounting in Flow Conidition" E-Forum Acusticum, Lyon, France, Dec. 1, 2020; pp. 765-772.

Vandercreek et al., "Comparison of Cavity Geometries for a Microphone Array in an Open-Jet Wind-Tunnel Experiment" 8th Berlin Beamforming Conference 2020, Mar. 1, 2020.

* cited by examiner

ACOUSTIC MEASURING DEVICE FOR REDUCING FLOW RESONANCE

CROSS-REFERENCES TO RELATED APPLICATIONS

This application claims the benefit of the French patent application No. 2102318 filed on Mar. 10, 2021, the entire disclosures of which are incorporated herein by way of reference.

FIELD OF THE INVENTION

The present application relates to an acoustic measuring device suitable for performing measurements in a flow.

BACKGROUND OF THE INVENTION

In wind tunnel or in-flight tests, to measure acoustic characteristics, an acoustic measuring device is positioned on a surface in contact with a grazing flow. According to one embodiment, the measuring device comprises an acoustic sensor, such as a microphone for example, positioned flush with the surface. This practice is not satisfactory because the turbulent boundary layer of the flow which forms on the surface pollutes the acoustic measurements over a wide range of frequencies.

To remedy this drawback, according to another embodiment, the acoustic measuring device comprises a cavity which emerges on the surface, an acoustic sensor positioned in the cavity and an acoustically transparent wall which closes the cavity flush with the surface. According to one configuration, the cavity comprises a flat bottom and a cylindrical lateral wall.

This embodiment makes it possible to reduce the pollution of the measurements by the flow. However, it is not fully satisfactory because a resonance phenomenon can appear in the cavity and pollute the acoustic measurements.

The present invention aims to wholly or partly remedy the drawbacks of the prior art.

SUMMARY OF THE INVENTION

To this end, a subject of the invention is an acoustic measuring device configured to be added onto a surface in operation, comprising an acoustic sensor and an acoustic surface delimiting a cavity and having an axis of revolution substantially at right angles to the surface in operation; wherein the acoustic surface comprises a recess that is centered with respect to the axis of revolution, configured to receive the acoustic sensor, and wherein, in a longitudinal plane passing through the axis of revolution, the acoustic surface follows a logarithmic profile which extends from a first edge separating the recess and the acoustic surface.

This solution makes it possible to obtain an acoustic measuring device of which the measurements are not polluted by the flow grazing the surface or by the geometry of its cavity.

According to another feature, the logarithmic profile is a natural logarithmic profile, any considered point of the logarithmic profile having a height in millimeters, a distance taken parallel to the axis of revolution separating the first edge and the considered point, such that $H=(2/M) \times Ln(D/Dmin)$, D corresponding to the diameter in millimeters of a circle passing through the considered point having for its center a point of the axis of revolution, Dmin being the diameter in millimeters of the recess, Ln corresponding to the natural logarithm function and M being a constant.

According to another feature, the acoustic measuring device comprises a peripheral zone, substantially flat and at right angles to the axis of revolution, forming a ring all around the acoustic surface, the logarithmic profile extending to a second edge separating the acoustic surface and the peripheral zone.

According to another feature, at least one edge out of the first and second edges is a sharp edge.

According to another feature, the acoustic surface has a maximum height, corresponding to the distance taken parallel to the axis of revolution between the first and second edges, of between 0.5 and 6 mm.

According to another feature, the second edge has a diameter of between 4 and 10 cm.

According to another feature, the recess has a diameter, of between 2 and 10 mm, adjusted to that of the acoustic sensor for there to remain only a small play (less than a mm) between the recess and the acoustic sensor.

According to another feature, the constant M is equal to $Ln(Dmax/Dmin) \times (2/Hmax)$, with a tolerance interval of +/−10%, Dmax being the diameter in millimeters of the second edge, Dmin being the diameter in millimeters of the recess, Hmax being the maximum height in millimeters of the acoustic surface, Dmax, Dmin and Hmax having determined values.

According to another feature, the acoustic measuring device comprises an acoustically transparent wall closing the cavity.

According to another feature, the acoustic measuring device comprises a support having a substantially flat first face, a second face, parallel to the first face, at which the cavity emerges, and a cylindrical peripheral face, the support comprising a peripheral setback positioned at the intersection of the second face and of the peripheral face and configured to house a wall onto which the acoustic measuring device is added.

Also a subject of the invention is an aircraft comprising at least one acoustic measuring device according to one of the preceding features.

BRIEF DESCRIPTION OF THE DRAWINGS

Other features and advantages will emerge from the following description of the invention, a description given purely by way of example, in light of the attached drawings in which.

DETAILED DESCRIPTION OF THE PREFERRED EMBODIMENTS

Figure 1:
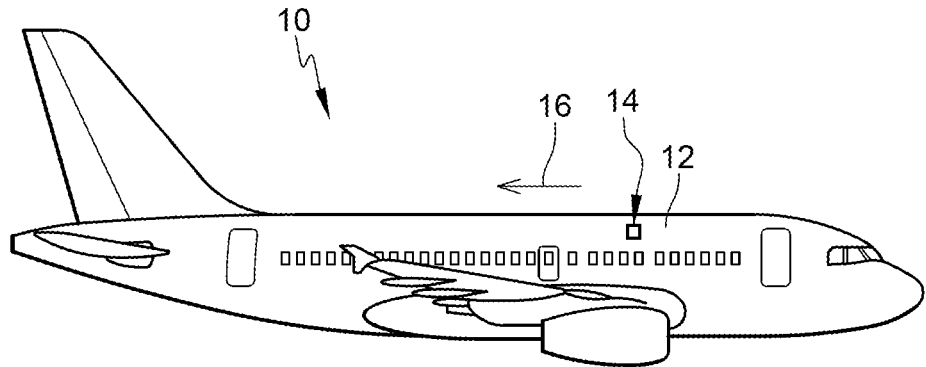
FIG. 1 is a side view of an aircraft.
Figure 3:
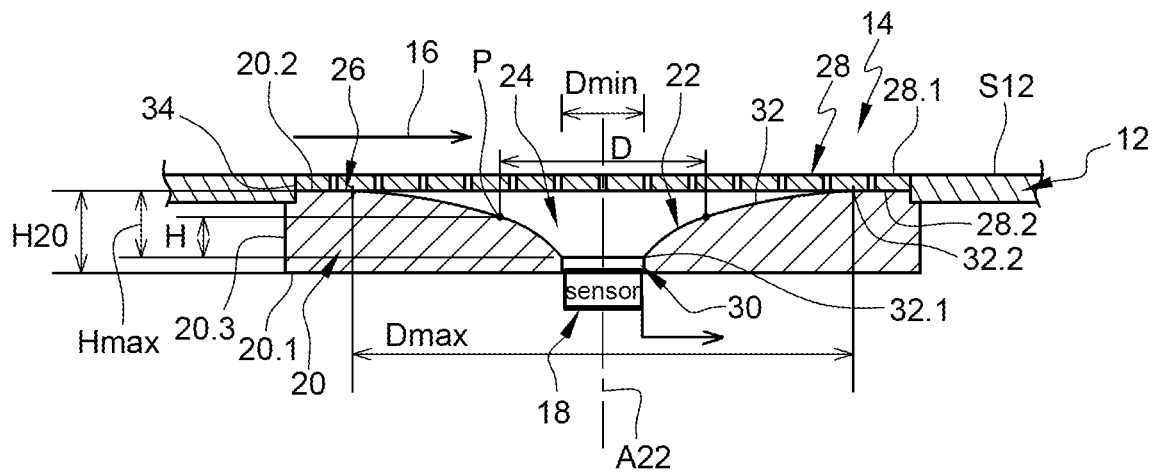
FIG. 3 is a cross section of an acoustic measuring device illustrating an embodiment of the invention.

According to an embodiment that can be seen in FIGS. 1 and 3, an aircraft 10 comprises a wall 12 which has a surface S12 and at least one acoustic measuring device 14 positioned on the surface S12. In flight, a flow 16 flows over the surface S12. The invention is not limited to this application. Thus, the acoustic measuring device 14 could be positioned on any surface in contact with a flow, such as surface positioned in a wind tunnel, for example.

As illustrated in FIG. 3, the acoustic measuring device 14 comprises an acoustic sensor 18, such as a microphone, for example, a support 20 which has an acoustic surface 22 delimiting a cavity 24 and having an axis of revolution A22 substantially at right angles to the surface S12.

The support 20 has a peripheral zone 26, substantially flat and at right angles to the axis of revolution A22, forming a ring all around the acoustic surface 22. This peripheral zone 26 is coaxial to the axis of revolution A22.

According to a configuration illustrated by FIG. 3, the acoustic measuring device 14 comprises an acoustically transparent wall 28 which closes the cavity 24. This acoustically transparent wall 28 takes the form of a disk pressed against the peripheral zone 26 and comprises a first face 28.1 in contact with the flow 16 and a second face 28.2 oriented toward the cavity 24 and opposite the first face 28.1. In operation, the acoustic measuring device 14 is positioned in such a way that the first face 28.1 of the acoustically transparent wall 28 is flush with the surface S12.

For information, the acoustically transparent wall 28 is a perforated sheet.

The invention is not limited to this configuration. Thus, the acoustic measuring device 14 could be provided without an acoustically transparent wall 28. In this case, in operation, the acoustic measuring device 14 is positioned in such a way that the peripheral zone 26 is flush with the surface S12.

The acoustic surface 22 comprises a recess 30 centered with respect to the axis of revolution A22, configured to receive the acoustic sensor 18. Thus, the acoustic sensor 18 is positioned substantially at the center of the acoustic surface 22. According to one configuration, the recess 30 is a hollow cylinder coaxial to the axis of revolution A22, having a diameter Dmin equal to or very slightly greater than the diameter of the acoustic sensor 18. For information, the diameter Dmin of the recess 30 is between 2 and 10 mm.

Obviously, the invention is not limited to this form for the recess 30. More generally, the latter comprises a section adjusted to that of the acoustic sensor 18 for there to remain only a small play (less than a mm) between the recess 30 and the acoustic sensor 18.

Depending on the case, the recess 30 can be blind or emergent and pass right through the support 20.

Figure 2:
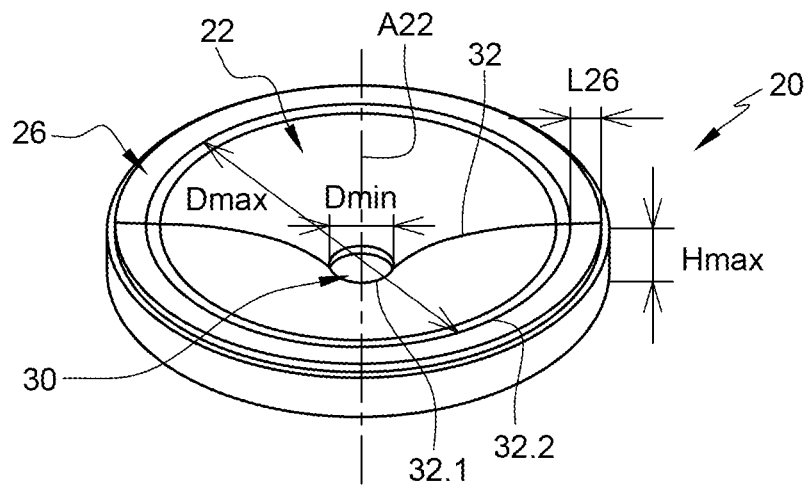
FIG. 2 is a perspective view of a support of an acoustic measuring device illustrating an embodiment of the invention.

According to a particular feature of the invention, in a longitudinal plane passing through the axis of revolution A22, the acoustic surface 22 follows a logarithmic profile 32 from the recess 30. This logarithmic profile 32 extends between a first edge 32.1 separating the recess 30 and the acoustic surface 22 and a second edge 32.2 separating the peripheral zone 26 and the acoustic surface 22. These first and second edges 32.1, 32.2 are centered on the axis of revolution A22. As illustrated in FIG. 2, the first edge 32.1 has a diameter Dmin and the second edge 32.2 has a maximum diameter Dmax.

According to a feature, the logarithmic profile 32 is a natural logarithmic profile. Thus, any considered point P of the logarithmic profile 32 has a height H in millimeters, a distance taken parallel to the axis of revolution separating the first edge 32.1 and the considered point P, such that:

$H=(2/M)\times Ln(D/Dmin)$, D corresponding to the diameter in millimeters of a circle passing through the considered point P having for its center a point of the axis of revolution A22, Dmin being the diameter in millimeters of the recess 30, Ln corresponding to the natural logarithm function and M being a constant.

The acoustic surface 22 has a maximum height Hmax, corresponding to the distance taken parallel to the axis of revolution A22 between the first and second edges 32.1 and 32.2, of between 0.5 mm and 6 mm.

The second edge 32.2 has a maximum diameter Dmax of between 4 and 10 cm, that is a function of the diameter Dmin of the first edge 32.1, of the maximum height Hmax and of the constant M.

According to one configuration, the constant $M=Ln(Dmax/Dmin)\times(2/Hmax)$ with a tolerance interval of +/−10%, Dmax corresponding to the diameter in millimeters of the second edge 32.2 of the acoustic surface 22, Dmin corresponding to the diameter in millimeters of the recess 30 and Hmax corresponding to the maximum height in millimeters of the acoustic surface 22, Dmax, Dmin and Hmax having determined values.

According to one embodiment, the diameter Dmin of the first edge 32.1 is substantially equal to 8 mm, the diameter Dmax of the second edge 32.2 is substantially equal to 52 mm, the maximum height Hmax is substantially equal to 6 mm and M has a value of the order of 0.64.

According to another feature, at least one edge out of the first and second edges 32.1, 32.2 is a sharp edge.

The support 20 has a substantially flat first face 20.1, a second face 20.2, parallel to the first face 20.1, at which the cavity 24 emerges, and a cylindrical peripheral face 20.3. The support has a height H20 (distance separating the first and second faces 20.1, 20.2) slightly greater than the maximum height Hmax of the acoustic surface 22. For information, $H20=Hmax+1$, H20 and Hmax being expressed in millimeters. The peripheral zone 26 has a width L26, a distance taken in a direction at right angles to the axis of revolution, of the order of 4 mm.

According to one configuration, the support 20 comprises a peripheral setback 34 positioned at the intersection of the second face 20.2 and of the peripheral face 20.3 and configured to house the wall 12 in such a way that the first face 28.1 of the acoustically transparent wall 28 is flush with the surface S12 or the peripheral zone 26 is flush with the surface S12 in the absence of an acoustically transparent wall 28.

The logarithmic profile 32 of the acoustic surface 22 makes it possible to reduce the resonance effects likely to pollute the acoustic measurements and obtain an angular response that is as flat as possible, of the order of +/−2 dB.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic measuring device configured to be added onto a surface in operation, comprising:
   an acoustic sensor; and
   an acoustic surface delimiting a cavity and having an axis of revolution substantially at right angles to the surface in operation;

wherein the acoustic surface comprises a recess, centered with respect to the axis of revolution, configured to receive the acoustic sensor, wherein, in a longitudinal plane passing through the axis of revolution, the acoustic surface follows a logarithmic profile which extends from a first edge separating the recess and the acoustic surface, wherein the logarithmic profile is a natural logarithmic profile, any considered point of the logarithmic profile having a height in millimeters, a distance taken parallel to the axis of revolution separating the first edge and the considered point, such that $H=(2/M)\times Ln(D/Dmin)$, D corresponding to a diameter in millimeters of a circle passing through the considered point having for its center a point of the axis of revolution, Dmin being the diameter in millimeters of the recess, Ln corresponding to a natural logarithm function, H being the height of the logarithmic profile, and M being a constant, and wherein the acoustic measuring device comprises a peripheral zone that is substantially flat and at right angles to the axis of revolution, forming a ring all around the acoustic surface, the logarithmic profile extending to a second edge separating the acoustic surface and the peripheral zone.

2. The acoustic measuring device as claimed in claim 1, wherein at least one edge out of the first and second edges is a sharp edge.

3. The acoustic measuring device as claimed in claim 1, wherein the acoustic surface has a maximum height, corresponding to a distance taken parallel to the axis of revolution between the first and second edges, lying between 0.5 and 6 mm.

4. The acoustic measuring device as claimed in claim 3, wherein the second edge has a diameter of between 4 and 10 cm, wherein the recess has a diameter of between 2 and 10 mm, adjusted to a diameter of the acoustic sensor for there to remain only a small play between the recess and the acoustic sensor, and wherein the constant M is equal to $Ln(Dmax/Dmin)\times(2/Hmax)$ with a tolerance interval of +/−10%, Dmax being a diameter in millimeters of the second edge, Dmin being the diameter in millimeters of the recess, Hmax being the maximum height in millimeters of the acoustic surface, Dmax, Dmin and Hmax having determined values.

5. The acoustic measuring device as claimed in claim 1, wherein the second edge has a diameter of between 4 and 10 cm.

6. The acoustic measuring device as claimed in claim 1, wherein the recess has a diameter of between 2 and 10 mm, adjusted to a diameter of the acoustic sensor for there to remain only a small play between the recess and the acoustic sensor.

7. The acoustic measuring device as claimed in claim 1, wherein the acoustic measuring device comprises an acoustically transparent wall closing the cavity.

8. The acoustic measuring device as claimed in claim 1, wherein the acoustic measuring device comprises a support having a substantially flat first face, a second face, parallel to the first face, at which the cavity emerges, and a cylindrical peripheral face, the support comprising a peripheral setback positioned at an intersection of the second face and of the peripheral face and configured to house a wall onto which the acoustic measuring device is added.

9. An aircraft comprising at least one acoustic measuring device as claimed in claim 1.

* * * * *